US010328801B2

(12) United States Patent
Kube

(10) Patent No.: US 10,328,801 B2
(45) Date of Patent: Jun. 25, 2019

(54) ELECTRICAL FUSE, METHOD OF OPERATING AN ELECTRICAL FUSE AND ELECTRICAL TRACTION NETWORK

(71) Applicant: VOLKSWAGEN AG, Wolfsburg (DE)

(72) Inventor: Roland Kube, Schwülper (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/669,185

(22) Filed: Aug. 4, 2017

(65) Prior Publication Data

US 2018/0147941 A1 May 31, 2018

(30) Foreign Application Priority Data

Nov. 28, 2016 (DE) .......................... 10 2016 223 565
Mar. 8, 2017 (DE) .......................... 10 2017 203 851

(51) Int. Cl.
*H01H 39/00* (2006.01)
*B60L 3/04* (2006.01)
(Continued)

(52) U.S. Cl.
CPC .............. *B60L 3/04* (2013.01); *B60L 3/0046* (2013.01); *B60L 50/64* (2019.02); *H01H 39/006* (2013.01);
(Continued)

(58) Field of Classification Search
CPC .......... B60L 3/04; B60L 3/0046; B60L 50/64; B60L 2240/545; H01H 39/00; H01H 39/006; H01H 2039/008
(Continued)

(56) References Cited

U.S. PATENT DOCUMENTS 6,141,202 A * 10/2000 Maeckel ................ H01H 85/46
337/143
6,411,190 B1 * 6/2002 Yamaguchi ............ H01H 39/00
180/279
(Continued)

FOREIGN PATENT DOCUMENTS

DE      1904244 A1    8/1970
DE      4422177 A1    1/1996
(Continued)

OTHER PUBLICATIONS

Search Report for European Patent Application No. 17175625.7; dated Feb. 1, 2018.

*Primary Examiner* — Jacob R Crum
(74) *Attorney, Agent, or Firm* — Barnes & Thornburg LLP

(57) ABSTRACT

An electrical circuit breaker, method for operating an electrical circuit breaker, and an electrical traction supply system, including an electro-pyrotechnic igniter, a severing element that moves by the electro-pyrotechnic igniter, and a current rail having a separation section, wherein the movable severing element is arranged in relation to the electro-pyrotechnic igniter and the separation section of the current rail so that, after the electro-pyrotechnic igniter is triggered, the movable severing element is set in motion and severs the current rail in the separation section, wherein the electrical circuit breaker includes at least one triggering apparatus configured to provide an ignition current necessary for triggering the electro-pyrotechnic igniter. Also disclosed are an associated method and an electrical traction supply system.

8 Claims, 7 Drawing Sheets

(51) Int. Cl.
*B60L 3/00* (2019.01)
*B60L 50/64* (2019.01)

(52) U.S. Cl.
CPC .. *B60L 2240/545* (2013.01); *H01H 2039/008* (2013.01)

(58) Field of Classification Search
USPC ........................................................ 337/157
See application file for complete search history.

(56) References Cited

U.S. PATENT DOCUMENTS

| | | | |
|---|---|---|---|
| 8,947,247 | B2 | 2/2015 | Engel et al. |
| 2003/0230177 | A1* | 12/2003 | Hamilton ............. B23D 15/145 83/13 |
| 2005/0083164 | A1* | 4/2005 | Caruso ................. H01H 39/006 337/157 |
| 2012/0106017 | A1* | 5/2012 | Schumacher ............. B60L 3/04 361/114 |
| 2013/0229742 | A1* | 9/2013 | Auguet ................. B60L 3/0046 361/114 |
| 2014/0015311 | A1* | 1/2014 | Spjuth ..................... B60R 16/02 307/9.1 |
| 2014/0065452 | A1* | 3/2014 | Hjerpe ................. H01M 2/1077 429/61 |

FOREIGN PATENT DOCUMENTS

| | | |
|---|---|---|
| DE | 19624883 C1 | 7/1997 |
| DE | 19830067 C1 | 3/2000 |
| DE | 102005003577 A1 | 8/2006 |
| DE | 102005046569 A1 | 4/2007 |
| DE | 102008063136 A1 | 9/2009 |
| DE | 102010002102 A1 | 8/2010 |
| DE | 102009051293 A1 | 5/2011 |
| DE | 102012214835 A1 | 2/2014 |
| DE | 102012214879 A1 | 2/2014 |
| DE | 102014218927 A1 | 3/2015 |
| DE | 112013003194 T5 | 3/2015 |
| DE | 102013226026 A1 | 6/2015 |
| DE | 202015106793 U1 | 1/2016 |
| EP | 0563947 A1 | 10/1993 |
| EP | 0725412 A2 | 8/1996 |
| EP | 1781485 A1 | 5/2007 |
| EP | 3054577 A1 | 8/2016 |

* cited by examiner

Moment of
Short Cut    $T = (L_{batt}+L_{harness})/R_i = 171.43$ μs (BEV)

ELECTRICAL FUSE, METHOD OF OPERATING AN ELECTRICAL FUSE AND ELECTRICAL TRACTION NETWORK

PRIORITY

This patent application claims priority to German Patent Application Nos. 10 2016 223 565.6, filed 28 Nov. 2016, and 10 2017 203 851.9, filed 7 Mar. 2017, the disclosures of which are incorporated herein by reference in their entireties.

SUMMARY

Illustrative embodiments relate to an electrical circuit breaker, a method for operating an electrical circuit breaker, and an electrical traction supply system.

BRIEF DESCRIPTION OF THE DRAWINGS

The disclosed embodiments are explained hereinunder with reference to the figures. In the figures.

DETAILED DESCRIPTION

Figure 1:
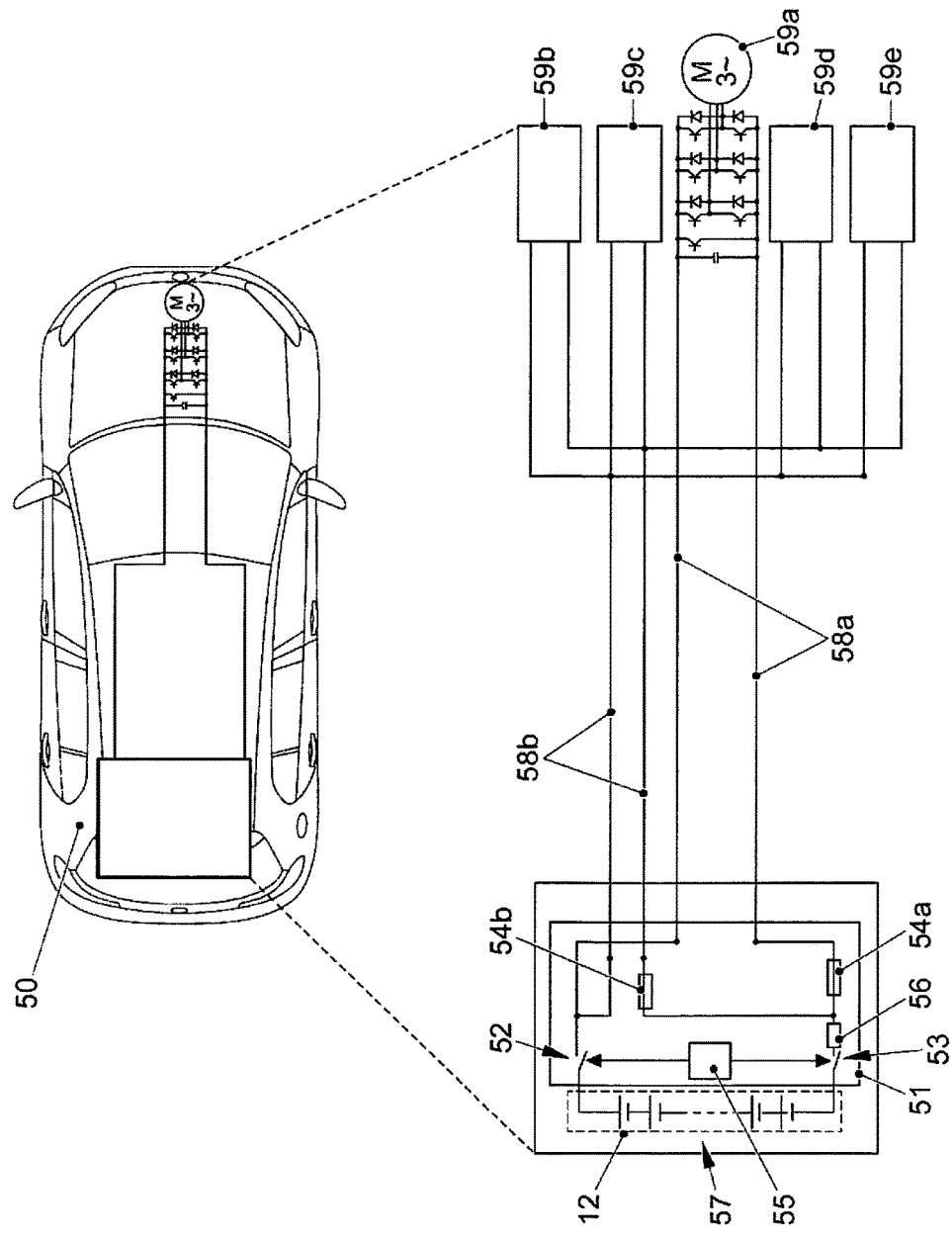
FIG. 1 illustrates a schematic view of a connection unit from the prior art in a motor vehicle having an electric drive.

High voltage batteries for motor vehicles comprise in addition to battery cells a connection unit (English="battery junction box") that renders it possible to connect a battery-internal high voltage actively to the vehicle traction supply system or to disconnect the high voltage therefrom. It can be achieved in this manner that high voltage is only present in the vehicle traction supply system when the vehicle is traveling, in contrast voltage is not present in a parked vehicle. The connection unit generally comprises two electromechanical contactors by means of which a positive path and a negative path can be switched in and out.

During the battery operation (for example, when the vehicle is travelling or when charging the batteries), an overload of the battery cells and the electromechanical contactors is prevented in that a maximum permissible current is limited, wherein prevailing boundary conditions are taken into consideration, such as, for example, a temperature of the battery cells. If the maximum current is exceeded, then after a predefined time period for a plausibility check the contactors are opened. This prevents the battery cells from being damaged.

Moreover, it is fundamentally necessary to ensure that the current carrying capacity of the contactors is not exceeded. Above the current carrying capacity, heat generated by the current flow causes the switch contacts of the contactors to weld together. To avoid this, the contactors must be opened before the current carrying capacity is achieved.

However, in the event of a short circuit, the current exceeds the current carrying capacity of the contactors so quickly that it must be expected that the switch contacts will weld together. An additional fusible safety fuse is therefore generally provided that in this event assumes the function of disconnecting the current circuit and thus protects both the battery cells and also the high voltage vehicle electrical supply from overloading.

When designing the circuit breakers, it is necessary to take into consideration aging of the circuit breakers caused by the extreme current peaks that occur during the vehicle operation. Since the trigger threshold of the circuit breakers drops as the aging increases, it is necessary to install circuit breakers that are sufficiently large so as even in the aged condition not to trigger in the case of current peaks within the normal range of the operating current. However, in the new state, these large circuit breakers have in contrast a higher trigger threshold so that the cable cross-sections of the connected high voltage vehicle electrical system must be selected to be correspondingly large.

In a traction supply system of a vehicle, it is not only the electric motor that is supplied by the high voltage battery but rather where appropriate other components, such as, for example, air-conditioning compressors, auxiliary heaters, charging devices and/or DC/DC convertors, are also supplied by the high voltage battery. Since such components consume considerably less power that the electric motor, it is known to connect the electric motor by way of master cables to the high voltage battery and to connect the other components by way of auxiliary cables to the high voltage battery, wherein the cables are protected by means of a fusible safety fuse that is tailored in each case to suit the currents flowing through the system.

Moreover, a pyro element (so-called "pyro fuse") is known for protecting 12 V batteries in vehicle electrical systems of motor vehicles. Such a pyro element is by way of example marketed by the company Autoliv as a "pyro safety switch (PSS)". The "pyro safety switch" is located in the direct proximity of the 12 V battery in the vehicle electrical system and in the event of an accident disconnects the connecting cable between the 12 V battery in the vehicle electrical system and a 12 V generator and/or a 12 V vehicle electrical supply. By way of example a signal from an airbag control unit (ACU) is used as a signal to trigger this disconnection. As soon as this signal assumes the state "active", the ACU generates a voltage of >10 V at a control input of the "pyro safety switch". Depending upon the internal resistance of the "pyro safety switch", this produces a current of >1.75 A, as a result of which an explosive charge explodes in an igniter of the "pyro safety switch" at the latest after 0.5 ms and a piston-shaped severing element is set in motion. At the latest after a further 0.1 ms, the piston-shaped severing element makes contact with a separation section of a current rail by means of a protrusion, which is especially configured for this purpose, and the current rail is severed. The current rail is subsequently disconnected and a current can no longer flow through the current rail.

DE 10 2010 002 102 discloses moreover an inverter device for electric vehicles. In this case, a control unit of a vehicle control system comprises a switch opening signal that is output by a collision detector if the collision detector is brought into operation as a result of a collision between electric vehicles. The inverter main-current-circuit connection switch of a high voltage battery unit is subsequently moved into the open state. In this manner, the direct current supply of a DC bus section from a high voltage battery is interrupted. Furthermore, electrical charges that are charged in a master-current-circuit capacitor are discharged by means of a forced-discharge-circuit section.

DE 10 2012 214 835 discloses a pyrotechnic switch for a motor vehicle battery system and a battery, wherein the switch comprises a shunt, which is connected in series in the switching-current path, a switching element, which is connected in series in the switching-current path, and a pyrotechnic igniter that can be activated electrically, wherein a control output of an electronic circuit is connected to the igniter and a control input of the circuit is connected to the shunt. Moreover, a method for controlling a pyrotechnic switch is described, the method comprising the operations: controlling at least one control input of the electronic circuit having an actual electrical variable, comparing the actual variable with a predeterminable limit value, activating the igniter insofar as the actual variable exceeds the limit value, and activating the switching element by means of the activated igniter, so that the supply current is disconnected, wherein the electronic circuit is buffered by a charge storage.

The disclosed embodiments are based on the technical problem of producing an electrical circuit breaker and a method for operating an electrical circuit, wherein a construction of the electrical circuit breaker is simplified. A further technical problem is the production of an improved electrical traction supply system.

An electrical circuit breaker is produced that comprises an electro-pyrotechnic igniter, a severing element, which can be moved by means of the electro-pyrotechnic igniter, and a current rail having a separation section, wherein the movable severing element is arranged in relation to the electro-pyrotechnic igniter and the separation section of the current rail in such a manner that after the electro-pyrotechnic igniter is triggered the movable severing element can be set in motion and thereby sever the current rail in the separation section, wherein the electrical circuit breaker comprises at least one trigger that is configured in such a manner as to provide an ignition current necessary for triggering the electro-pyrotechnic igniter based on a current that is supplied by way of at least one section of the current rail or based on a temporal change in the current if the current that is supplied on the at least one section of the current rail or the temporal change of the current exceeds a limit value.

Moreover, a method for operating an electrical circuit breaker is provided and the method comprises the following operations: providing an ignition current for an electro-pyrotechnic igniter, triggering the electro-pyrotechnic igniter, moving a movable severing element by means of the triggered electro-pyrotechnic igniter, severing a separation section of a current rail by means of the movable severing element, wherein the ignition current necessary for triggering the electro-pyrotechnic igniter is provided using at least one trigger based on a current that is supplied by way of at least one section of the current rail or based on a temporal change in the current if the current that is supplied on the at least one section of the current rail or the temporal change of the current exceeds a limit value.

Moreover, an electrical traction supply system is provided in a motor vehicle, the electrical traction supply system comprising a high voltage supply source, optionally a high voltage battery, an electric motor and other high voltage components, wherein the electric motor is connected to the high voltage supply source by way of master cables and the other high voltage components are connected to the high voltage supply source by way of auxiliary cables. A previously described electrical circuit breaker is arranged in the master cables and/or in the auxiliary cables respectively, in other words the master cables and/or auxiliary cables are protected independently of one another. It is also possible to provide that by way of example only the master cables are protected by means of an electrical circuit breaker but the auxiliary cables still comprise a fusible safety fuse and conversely. However, both the master cables and also the auxiliary cables may comprise an electrical circuit breaker. The master cables and the auxiliary cables can be disconnected independently of one another so that by way of example the electric motor can still be operated if the auxiliary cables are disconnected. It is further possible to provide that dedicated auxiliary cables are allocated in each case to the multiple other components so that it is necessary to disconnect in each case in a purposeful manner only the auxiliary cables of those components where a defect is detected.

In an alternative disclosed embodiment, the master cables and auxiliary cables are protected by means of a common electrical circuit breaker, wherein the electrical circuit breaker comprises two triggers, wherein a first section of the current rail is allocated to the first triggers and a second section of the current rail is allocated to the other triggers, wherein the currents flowing through the first section and the second section are different. The second section is allocated to the auxiliary cables. This disclosed embodiment requires fewer components; however, in the case of a defect it always causes the entire traction supply system to be switched off.

The disclosed embodiments provide an ignition current for an electro-pyrotechnic igniter based on a current that is supplied on at least one section of the current rail or based on the temporal change of the current. For this purpose, the electrical circuit breaker comprises at least one trigger by which it is possible to provide such an ignition current.

It is possible to use only passive components so that an additional electronic control system can be omitted. This leads to a reduction in the outlay and lower costs. Moreover, the circuit breaker can be of a very compact design so that only a small amount of installation space is required.

In at least one disclosed embodiment, the electrical circuit breaker is embodied as a pyro-element in which the at least one trigger is integrated and this renders possible a compact construction.

It is provided in at least one disclosed embodiment that the at least one trigger comprises an induction loop, wherein the inductance of the induction loop is defined in such a manner that the induction loop can provide the necessary ignition current by way of an inductive coupling to at least one section of the current rail. The induction loop may provide the ignition current directly if the current that is flowing by way of the current rail or the temporal change of the current exceeds the limit value. The inductance of the induction loop is then configured according to the predetermined limit value. If the temporal change of the current on the section of the current rail is below the limit value then the current that is induced by means of the induction loop is also below the necessary ignition current. to ensure this even in the case of defects superimposed on the nominal or operating currents, by way of example caused by the high frequency switching procedures in the pulse invertor of the electric drive or of the air-conditioning compressor, it is sometimes necessary to provide downstream of the inductances filters that avoid false activations.

If the limit value is exceeded, the induced current achieves the necessary ignition current and triggers the igniter. In this disclosed embodiment, a galvanic isolation is provided even without any additional outlay.

Moreover, it is provided in a further disclosed embodiment that the at least one trigger comprises moreover an iron core that can be moved into the induction loop and it is possible by way of the iron core to change the inductance. This renders it possible to adjust the inductance and thereby also adjust in a purposeful manner the limit value for the temporal change of the current by way of the section on the current rail in which the necessary ignition current for the igniter is to be provided. It is thus possible to produce the electrical circuit breaker in a variable manner with regard to the limit value and then to define the specific limit value in advance prior to, during or after installation, by way of example in a motor vehicle. Moreover, the limit value can also be changed retrospectively, by way of example to react to changes in the motor vehicle, by way of example the installation of another battery etc. The limit value can then be adjusted to suit in a simple manner.

In a further disclosed embodiment, the iron core is displaced, by way of example, with the aid of a bimetallic element automatically based upon a temperature, for example, the temperature within the battery housing, so that the triggering threshold of the electrical circuit breaker is automatically adjusted in response to changed environmental conditions. This is beneficial, for example, in the case of a short circuit occurring after the battery temperature returns to a very low value, possibly during a period when the vehicle is parked in winter after an operating phase. Owing to the battery discharge capacity that is greatly limited in the case of a low temperature, only a battery current that is within the normal range of the operating current is produced in the case of a normal temperature even in the case of a short circuit under these conditions and the current is consequently far below a triggering threshold that is not adjusted based upon the temperature. Without the circuit breaker being triggered, this current although comparatively low would be available until the deep discharge of the battery has occurred. This situation and the resulting irreversible damage to the battery can be avoided by making an adjustment based upon the temperature to the circuit breaker triggering threshold.

It is provided in a further disclosed embodiment that the at least one trigger comprises a coupling element, wherein the capacitance that corresponds to the coupling element is defined in such a manner that the coupling element can provide the necessary ignition current by way of a capacitive coupling to the section of the current rail. In so doing, the coupling element and the section of the current rail form capacitor plates of a capacitor. If the current that is flowing through the section of the current rail increases suddenly after a short circuit, then the charge density increases in the section of the current rail. This causes corresponding image charges that must flow to the coupling element. The current flow of the image charges is then used as the ignition current. The capacitance that is formed out of the coupling element and the section of the current rail is configured in such a manner that in the case of the limit value on the section of the current rail being exceeded, a corresponding current flow is produced by virtue of the image charges flowing to the coupling element. The current flow is sufficient to provide the necessary ignition current and to start the igniter. As a consequence, it is likewise possible to configure the capacitance in a variable manner. By way of example, the spacing between the coupling element and the at least one section can be adjusted and the capacitance can be adjusted by way of the spacing. It is also possible to automatically change the spacing based upon the temperature by way of example with the aid of a bimetallic element according to the statements made in relation to the iron core.

It is provided in a further disclosed embodiment that the at least one trigger comprises a PTC thermistor, wherein the PTC thermistor is dimensioned in such a manner and arranged in or on the section of the current rail in such a manner that a voltage that is dropping across the PTC thermistor and is produced as a result of the current that is flowing through the PTC thermistor can still provide the necessary ignition current. PTC thermistors of this type comprise a positive temperature coefficient (PTC). If the current that is flowing on the section of the current rail increases above the limit value, the temperature of the PTC thermistor increases greatly and its resistance increases greatly. As a consequence, it is possible to tap a voltage at the PTC thermistor that is sufficient to generate the necessary ignition current at the igniter.

It is possible both in the case of the capacitive coupling by means of the coupling element and also in the case of the PTC thermistor to provide means for the galvanic isolation, by way of example as an optical coupler.

At least two triggers are provided in a further disclosed embodiment, wherein a first section of the current rail is allocated to the first trigger and a second section of the current rail is allocated to the second trigger, wherein the currents flowing through the first section and the second section are different. It is then possible by means of such an electrical circuit breaker to protect both the master cables and also the auxiliary cables of a traction supply system by means of a circuit breaker. In so doing, the current rail then comprises a branch to the auxiliary cables, on which the second section can then be established.

The electrical circuit breaker and the method for protecting a high voltage battery (400 V) may be used in a motor vehicle, in particular in a motor vehicle comprising a hybrid or electric drive. The electrical circuit breaker and the method can however in principle also be used to protect other vehicle batteries comprising other voltage levels (for example, 48 V or 850 V) and other devices.

The disclosed method comprises the identical benefits as the corresponding features of the electrical circuit breaker.

FIG. 1 illustrates a schematic view of a connection unit 51 in a motor vehicle 50. The connection unit 51 comprises two electromechanical contactors 52, 53, a current sensor 56, fusible safety fuses 54a,b and a controller 55. During the battery operation (for example, when the vehicle is travelling or when charging the batteries), an overload of the battery cells 57 of a high voltage battery 12 and the contactors 52, 53 is prevented in that a maximum permissible current is limited, wherein prevailing boundary conditions are taken into consideration, such as, for example, a temperature of the battery cells 57. For this purpose, the controller 55 uses the current sensor 56 to ascertain a current that is supplied from the battery cells 57 to a consumer, by way of example an electric motor 59a and an air-conditioning compressor 59b, an auxiliary heater 59c, a charging device 59d or a DC/DC converter 59e of the motor vehicle. If the maximum current is exceeded then, after a predefined time period for a plausibility check, the contactors 52, 53 are opened by means of the controller 55. This prevents the battery cells 57 from being damaged. Furthermore, the fusible safety fuses 54a and 54b protect both the battery cells 57 and also the high voltage vehicle electrical supply from being overloaded. The electric motor 59a is connected to the high voltage battery 12 by way of master cables 58a and the other high voltage components 59b-e are connected to the high voltage battery 12 by way of auxiliary cables 58b, wherein the fusible safety fuse 54a protects the master cables 58a and the fusible safety fuse 54b protects the auxiliary cables 58b. The fusible safety fuse 54a is configured by way of example to 400 A and the fusible safety fuse 54b to 40 A.

When designing the circuit breakers, it is necessary to take into consideration the aging of the circuit breakers that occurs as a result of the extreme current peaks. Since the trigger threshold of the circuit breakers drops as the aging increases, it is necessary to install circuit breakers that are sufficiently large so as even in the aged condition not to trigger in the case of current peaks within the normal range of the operating current. However, in the new state, these large circuit breakers have in contrast a higher trigger threshold so that the cable cross sections of the connected high voltage vehicle electrical system must be selected to be correspondingly large.

To avoid this, the disclosed electrical circuit breaker is to be used in lieu of the fusible safety fuses 54a,b. The current circuit can then be interrupted based upon the vehicle running time and the age of the component precisely in the case of the defined limit values. The cable cross sections in the high voltage vehicle electrical supply can be tailored to suit accordingly and defined in a purposeful manner.

Figure 2:
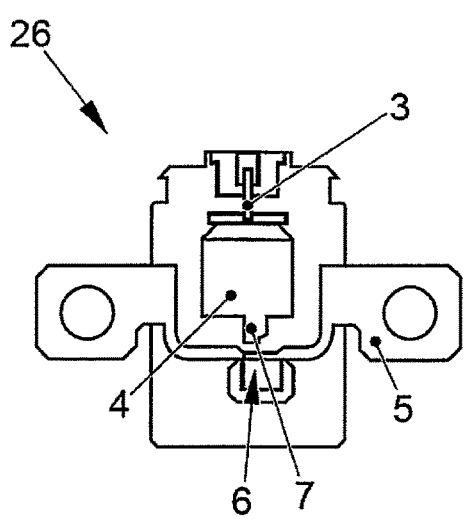
FIG. 2 illustrates a schematic view of a pyro element from the prior art.

FIG. 2 illustrates a schematic view of a pyro element 26 (for example, a "pyro safety switch" marketed by the company Autoliv) from the prior art. The pyro element 26 comprises an electro-pyrotechnic igniter 3, a severing element 4 that can be moved by means of the electro-pyrotechnic igniter 3, and a current rail 5 having a separation section 6. The movable severing element 4 is arranged between the electro-pyrotechnic igniter 3 and the separation section 6 of the current rail 5 so that after the electro-pyrotechnic igniter 3 is triggered the movable severing element 4 is set in motion and thereby severs the current rail 5 in the separation section 6 by means of a protrusion 7 that is provided for this purpose. An ignition current that is necessary for the triggering procedure is to be in the following examples in the region of >1.75 A (corresponding to the necessary ignition current of the pyro element marketed by the company Autoliv). However, depending upon the igniter 3 that is used, other ignition currents can also be necessary.

Figure 3:
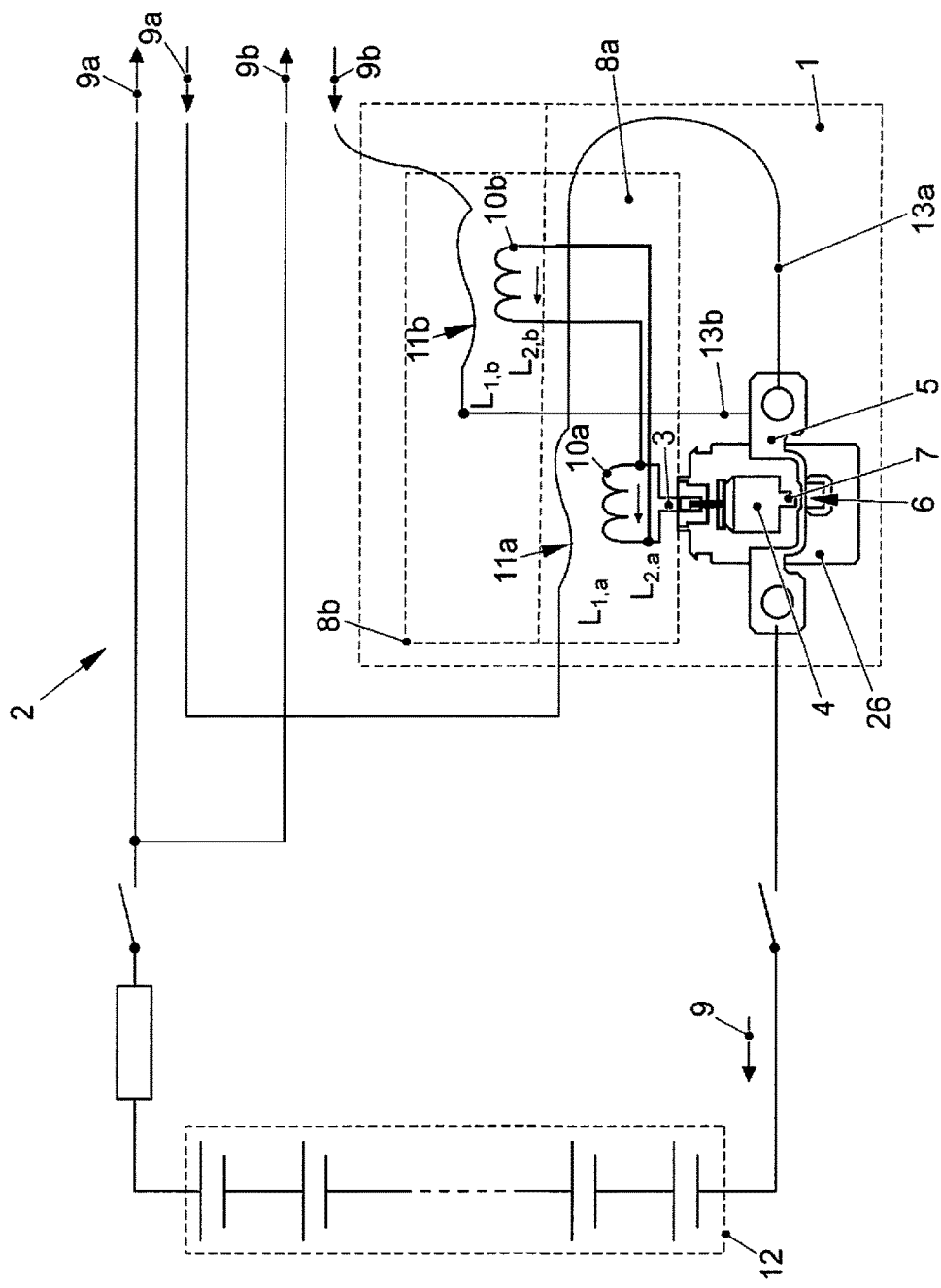
FIG. 3 illustrates a schematic view of a pyro element having an induction loop in a circuit arrangement.

FIG. 3 illustrates a switching arrangement 2 for explaining the disclosure. A pyro element 26 as illustrated in FIG. 2 is coupled in an inductive manner to the high voltage cables 13a and 13b. The high voltage cable 13a corresponds to a master cable 58a and the high voltage cable 13b corresponds to an auxiliary cable 58b in accordance with FIG. 1. This coupling is achieved by means of triggers 8a, 8b, which provide the ignition current necessary to trigger the electro-pyrotechnic igniter 3 of the pyro element 26 if the current 9a and/or 9b that is supplied on the high voltage cable 13a and/or 13b changes according to the current gradients that are to be expected in the event of a short circuit.

In so doing, the inductive coupling of the triggers 8a, 8b is embodied by means of induction loops 10a and 10b. It is provided that an inductance L2a and L2b of the induction loops 10a and 10b is defined in such a manner that the induction loops 10a and/or 10b provide the necessary ignition current by way of an inductive coupling with the high voltage cable 13a and 13b.

If the induction loops 10a and 10b are positioned in the physical proximity of the high voltage cables 13a and 13b with their parasitic inductances L1,a and L1,b, an induced voltage UPyro is produced at the igniter 3 and the induced voltage is proportional to the ratio of the inductances L2,a and L1,a or L2,b and L1,b and also to the change in the currents 9a or 9b that are supplied by way of the high voltage cables 13a and/or 13b. In the case of a suitable selection of the inductance L2,a and L2,b and also the selection of the spacing of the two inductances L1,a and L2,a and also L1,b and L2,b with respect to one another, it is possible to achieve that in the event of a short circuit occurring the induced voltage UPyro is sufficiently large enough so as to generate a necessary ignition current IPyro>1.75 A in the ignition circuit of the igniter 3 and thereby to trigger the igniter.

Assuming a total inductance LHVB,1 of 20 µH for the master path to the high power drive (current 9a) and a total inductance for the auxiliary cable path LHVB,2 of 5 µH for the auxiliary path to the lower power auxiliary units (current 9b) and a resistance RHVB of 100 mΩ (incl. the high voltage battery 12) of the switching arrangement 2, by way of example of a high voltage vehicle electrical supply in a motor vehicle, the following time constants are produced:

$$\tau_{HVB,1} = L_{HVB,1}/R_{HVB} = 20*10^{-6}\ H/100*10^{-3}\Omega = 0.2\ ms$$

and $$\tau_{HVB,2} = L_{HVB,2}/R_{HBV} = 5*10^{-6}\ H/100*10^{-3}\Omega = 0.05\ ms.$$

This means that, 0.2 ms or 0.05 ms after the short circuit has occurred, 63% of the stationary short circuit current are achieved (Definition of the time constants of a system of the 1st order). In the case of an assumed battery voltage of the high voltage battery 12 of UBatt=400 V, a value is produced for the stationary short circuit current of:

$$I_{KS} = 400\ V/100\ m\Omega = 4000\ A,$$

from which there follows in the event of a short circuit a temporal current change of $$\Delta I_{KS,1}/\Delta t = 0.66*4000\ A/0.2\ ms = 13.2*10^6\ A/s$$

or $$\Delta I_{KS,2}/\Delta t = 0.66*4000\ A/0.05\ ms = 52.8*10^6\ A/s.$$

Assuming an inductance per unit length of 1 nH/cm for the high voltage cable 13a and 0.5 nH/cm for the high voltage cable 13b and a length of the inductances $L_{2,a}$ and $L_{2,b}$ of 1 cm, this current change induces in the inductance $L_{1,a}$ the voltage $$U_{HV,a} = -L_{1,a}*\Delta I_{KS}/\Delta t = -1\ nH*13.2*10^6\ A/s = -13.2*10^{-3}\ Vs/A*A/s = -13.2\ mV.$$

and in the inductance $L_{1,b}$ the voltage $$U_{HV,b} = -L_{1,b}*\Delta I_{KS}/\Delta t = -0.5\ nH*52.8*10^6\ A/s = -26.4*10^{-3}\ Vs/A*A/s = -26.4\ mV.$$

Assuming also a coupling factor of 1 between the two inductances L1,a and L2,a and also L1,b and L2,b, this produces a voltage in the inductance L2 of $$U_{Pyro} = (L_{2,a}/L_{1,a})*U_{HV,a} \qquad (1a)$$

or $$U_{Pyro} = (L_{2,b}/L_{1,b})*U_{Hv,b}. \qquad (1b)$$

Assuming also an electrical internal resistance of the igniter 3 of 5Ω (generally such igniters have internal resistances of 0.2Ω to 4.5Ω), then to exceed the triggering current IPyro of 1.75 A it is necessary to have an induced voltage in the inductances L2,a and L2,b of $U_{Pyro}$>5 Ω*1.75 A=8.75 V The inductances L2,a and L2,b necessary for this arise from the equation (1a) and (1b) to $L_{2,a}=(U_{pyro}/U_{HV,a})*L_{1,a}$=(8.75 V/13.2 mV)*1 nH=0.66 µH or $L_{2,b}=(U_{Pyro}/U_{HV,b})*L_{1,b}$=(8.75 V/26.4 mV)*0.5 nH=0.17 µH and consequently lie within a range that renders it possible to achieve the inductance within a manageable installation space. Thus, the inductances $L_{2,a}$ and $L_{2,b}$ are integrated by way of example directly in the pyro element 26.

Figure 4:
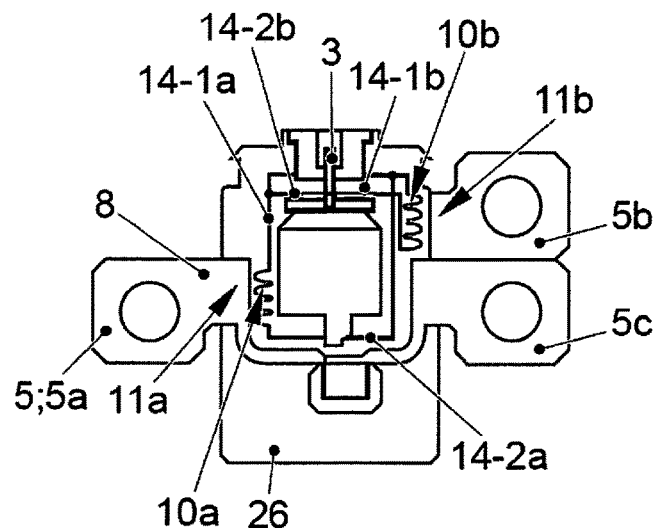
FIG. 4 illustrates a schematic view of an embodiment of the electrical circuit breaker having an inductive coupling.

FIG. 4 illustrates such a compact embodiment of the electrical circuit breaker 1. The induction loops 10a and 10b are integrated directly in the pyro element 26 so that the electrical circuit breaker 1 is embodied in a compact manner with small dimensions. The induction loops 10a and 10b are arranged over a length of approx. 1 cm at the sections 11a and 11b of the current rail 5 and coupled in an inductive manner thereto. The current rail 5 comprises a terminal tab 5a by way of which the current rail 5 is connected to the high voltage battery 12. Moreover, the current rail 5 comprises a terminal tab 5b and 5c, wherein the high voltage cable 13b is connected to the terminal tab 5b and the high voltage cable 13a is connected to the terminal tab 5c. Although the entire current flows by way of the section 11a and not only the current into the high voltage cable 13a, since this is however considerably greater than the current in the high voltage line 13b, this is negligible. In principle, the induction loop 10a could however also be arranged on the terminal tab 5c. This also applies for the embodiments explained later. An inductance of the induction loops 10a and 10b is dimensioned according to the above described calculation by way of example to 0.66 µH or 0.17 µH and the induction loops 10a and 10b are connected by way of supply lines 14-1a, 14-2a or 14-1b, 14-2b to the igniter 3. The inductance of the sections 11a and 11b corresponds in this case to the assumptions of 1 nH or 0.5 nH made above.

Figure 5:
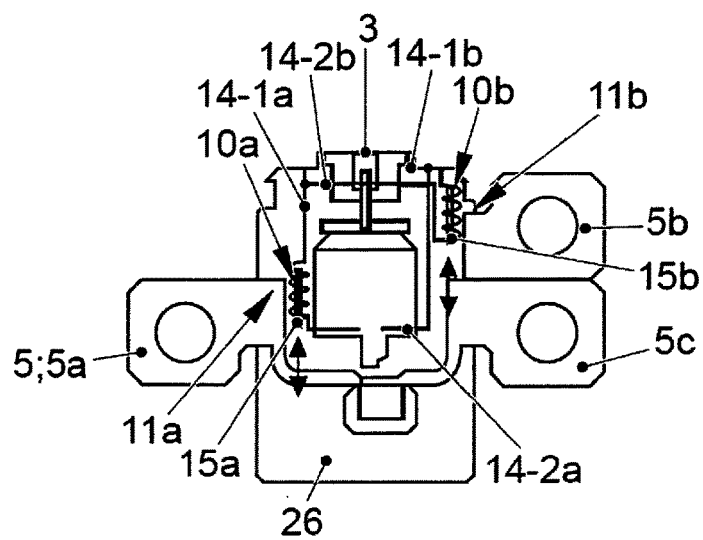
FIG. 5 illustrates a schematic view of a further embodiment of the electrical circuit breaker having an inductive coupling.

FIG. 5 illustrates a schematic illustration of a further disclosed embodiment of the electrical circuit breaker 1. This disclosed embodiment is to a great extent identical to the embodiment illustrated in FIG. 4. Identical reference numerals describe in this case identical terms or features. It is additionally provided that the triggers 8a, 8b moreover comprise iron cores 15a and 15b that can be moved into the induction loops 10a and 10b and by way of the iron cores it is possible to adjust the inductances. The movable iron cores 15a and 15b render it possible to adjust the inductances by way of example also after the electrical circuit breaker 1 has been produced and in this respect in a flexible manner to adjust the limit value for the change of the currents flowing by way of the sections 11a, 11b and to tailor the limit value to suit the prevailing boundary conditions.

Figure 6:
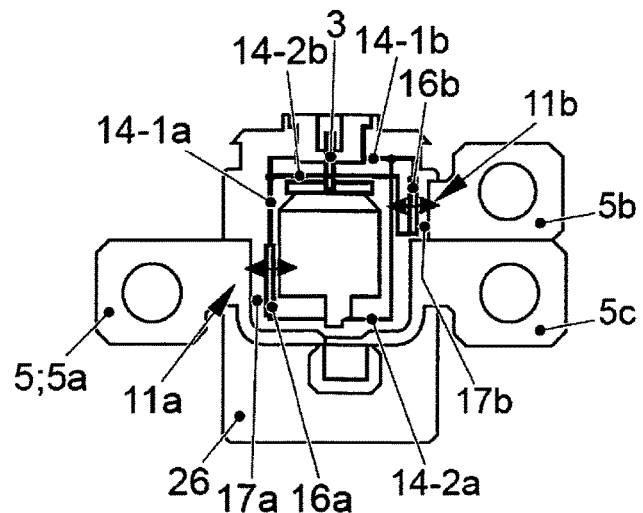
FIG. 6 illustrates a schematic view of a further embodiment of the electrical circuit breaker having a capacitive coupling.

FIG. 6 illustrates a schematic illustration of a further embodiment of the electrical circuit breaker 1. The electrical circuit breaker 1 is to a great extent identical to the embodiments already described, identical reference numerals describe again identical features or terms. However, it is provided in this embodiment that the triggers 8a, 8b comprise coupling elements 16a and 16b. These coupling elements 16a and 16b are embodied as capacitor plates and together with the sections 11a and 11b of the current rails 5 form in each case a capacitor, wherein the sections 11a and 11b in this case are to be regarded as virtual capacitor plates of the capacitors. The capacitances of these capacitors are defined in such a manner that the coupling elements 16a and 16b provide the necessary ignition current for the igniter 3 by way of the capacitive couplings with the sections 11a and 11b of the current rails 5a and 5b if the current change or the current on at least one of the sections 11a or 11b exceeds a limit value.

The coupling elements 16a and 16b can be configured so as to be able to move with respect to the sections 11a and 11b of the current rails 5a and 5b by the amount of the spacings 17a and 17b. In this respect, the capacitances of the capacitors formed can be adjusted, wherein the capacitances are in a first approximation directly anti-proportional to the spacings 17a and 17b.

In a first approximation, the capacitances of the capacitor (in the case of a predetermined width) are arranged proportional to the length of the sections 11a and 11b in which the coupling elements 16a and 16b are arranged parallel to the sections 11a, 11b. The capacitors having the capacitances C12,a and C12,b produce a coupling between the current circuits, which are guided by way of the sections 11a and 11b, and the current circuit that leads to the igniter 3. The following equation applies for the currents flowing to the capacitor plates:

$i_a = C_{12,a} * du/dt$ (2a)

or $i_b = C_{12,b} * du/dt$ (2b)

with du/dt as the temporal change in the voltage.

In the case of capacitances of by way of example 100 pF and an electrical voltage change of 400 V within 0.1 µs, a current of 400 mA is produced.

By taking into consideration maximum permissible external dimensions for the pyro element 26, a useable section of the sections 11a, 11b of 1 cm is available for the capacitive coupling. When using copper as a conductive material for the current rails 5, an electrical resistance $R = r_{Cu} * A = 0.01789$ Ωmm²/m*1 cm 50 mm²=3.56µΩ is produced for a length of 1 cm and a cross-sectional area A of 50 mm².

Figure 7:
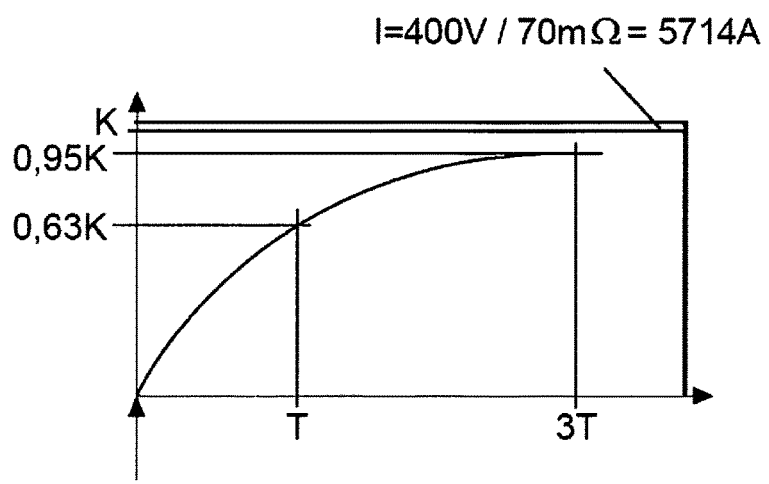
FIG. 7 illustrates a schematic view of the temporal progression of a current in the case of a short circuit.

Assuming an internal resistance Ri of the high voltage battery 12 of 70 mΩ and an inductance Lbatt of the high voltage battery of 9.5 µH, and also an inductance of the high voltage vehicle electrical supply system Lharness,a of 2.5 µH of Lharness,b of 1.25 µH, the following time constants are produced:

$T_a = (L_{batt} + L_{harness,a})/R_i$=12 µH/70 mΩ=171.43 µs, or $T_b = (L_{batt} + L_{harness,b})/R_i$=10.75 µH/70 mΩ=153.57 µs, with which a short circuit current increases to 66% of its stationary end value of 5714 A (FIG. 7). This means that the current change directly after a short circuit occurs amounts to $$di_{KS,a}/dt = 0.66 * 5714 \text{ A}/171.43 \text{ μs} = 21.99 * 10^6 \text{ A/s}$$

or $$di_{KS,b}/dt = 0.66 * 5714 \text{ A}/153.57 \text{ μs} = 23.55 * 10^6 \text{ A/s},$$

which with the electrical resistance of the current rails of 3.56μΩ (see above) produces a change in the voltage of $$du_a/dt = R * di_{KS,a}/dt = 3.56 \text{μΩ} \, 21.99 * 10^6 \text{ A/s} = 78.28 \text{ V/s}$$

or $$du_b/dt = R * di_{KS,b}/dt = 3.56 \text{μΩ} \, 23.55 * 10^6 \text{ A/s} = 83.83 \text{ V/s}$$

It is to be noted in this case that the assumed values deviate slightly from the assumed values in the case of the calculation of the inductance with respect to FIG. 3. Lharness is the inductance per unit length of the high voltage cables 13a or 13b.

The equations 2a and 2b produce the following for the capacitors $$C_{12a,b} = i/(du_{a,b}/dt),$$

which produces values for the capacitances of 23.36 mF or 20.88 mF, so as in the case of a voltage change of 78.28 V/s or 83.83 V/s to produce the ignition current of 1.75 A necessary to trigger the pyro element 26.

A capacitive coupling by way of a capacitance having such a value of 23.36 mF or 20.88 mF can be achieved in an acceptable installation space by way of example by means of double layer capacitors.

Figure 8:
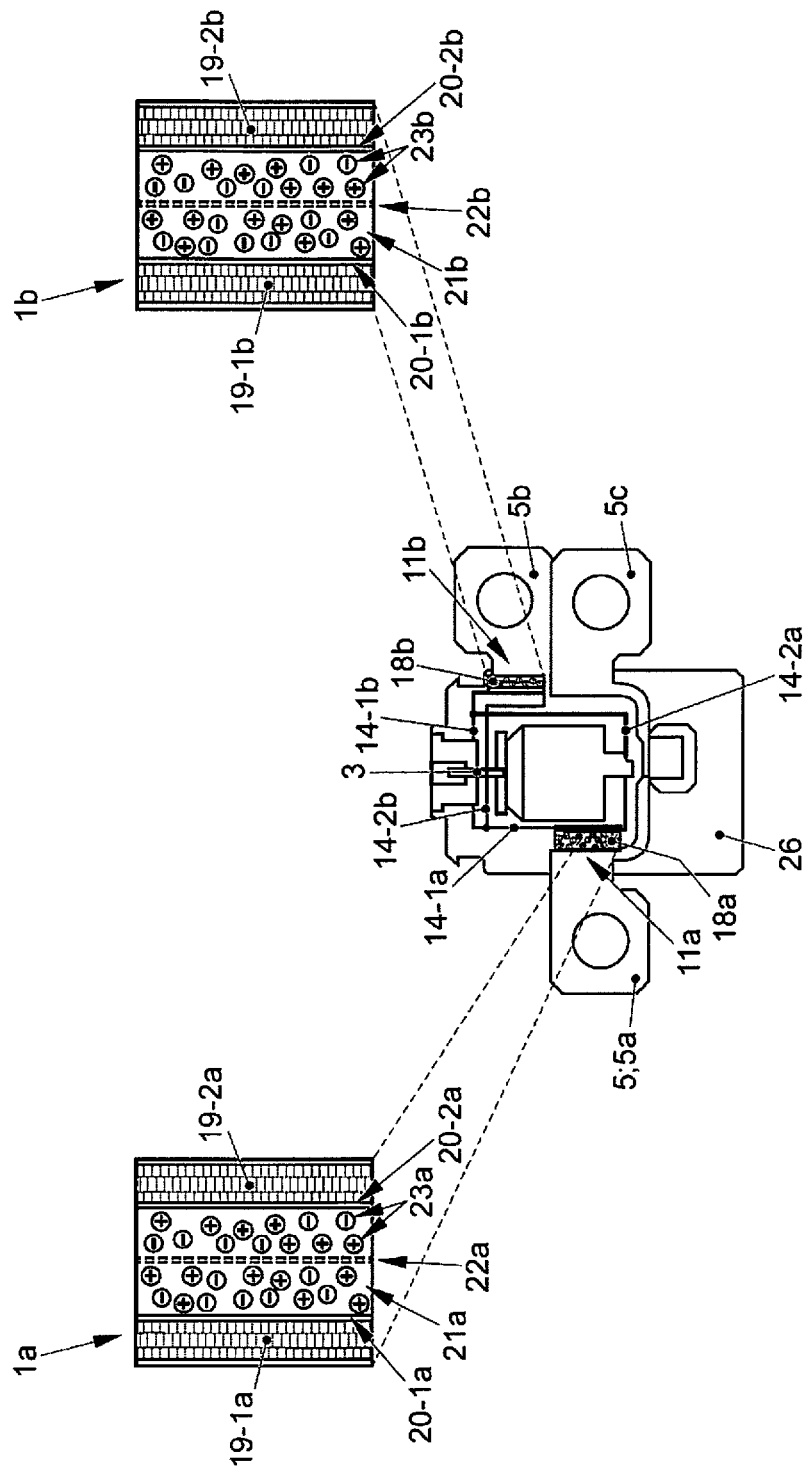
FIG. 8 illustrates a schematic view of a further embodiment of the electrical circuit breaker having a capacitive coupling by a double-layer capacitor.

FIG. 8 illustrates schematically a disclosed embodiment of the electrical circuit breaker 1 having double layer capacitors 18a and 18b. The double layer capacitors 18a and 18b comprise in each case two electrodes 19-1a,b and 19-2a,b and in each case an electrolyte 21a,b having in each case an electrically permeable separator 22a,b so that when a voltage is applied two double layers 20-1a, 20-2a and 20-1b, 20-2b are formed in which in each case one layer of positive and negative ions 23 a, b are formed in a mirror-image arrangement. At least in each case a double layer capacitor 18a and 18b is arranged at the sections 11a and 11b of the current rail 5, wherein the electrodes 19-1a and 19-1b are connected in an electrical manner to the sections 11a, 11b while the electrode 19-2a and 19-2b are connected to the igniter 3 by way of supply lines 14-1a and 14-2a or 14-1b and 14-2b.

It is also possible to achieve a sufficiently large capacitance with the aid of other types of capacitors. By way of example, supercapacitors can also be used. An electrolyte is not used for the implementation in accordance with the principle of high power supercapacitors. Such supercapacitors are produced or developed by way of example by the company Skeleton in Estonia or by the Technology Center for Nanoscience at the University of Florida. The principle of the supercapacitors developed by the university in Florida is based on fine wires that have an insulating sheathing of only a few nanometer thick.

Figure 9:
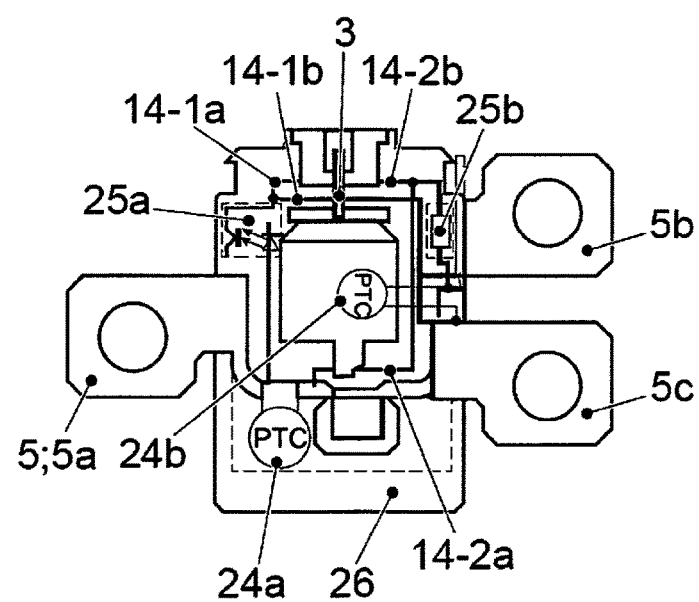
FIG. 9 illustrates a schematic view of a further embodiment of the electrical circuit breaker having a PTC thermistor.

FIG. 9 illustrates a schematic view of a further disclosed embodiment of the electrical circuit breaker 1. The principle construction is again almost identical to the already described embodiments but the triggers 8a, 8b in this disclosed embodiment comprise PTC thermistors 24a and 24b (positive temperature coefficient, PTC). The PTC thermistors 24a and 24b are connected in series in the current rail 5. Since a direct tapping of the voltage drop across the PTC thermistors 24a and 24b in contrast to an inductive and capacitive coupling does not involve an intrinsic potential separation, in this disclosed embodiment means are still provided for implementing the galvanic separation by way of example by means of optical couplers 25a and 25b (only schematically illustrated).

The optical couplers 25a and 25b comprise in each case a photo-transistor and in each case a light diode. The photo-transistors are configured in such a manner that in the fully controlled state they provide the necessary ignition current for the igniter 3. The light diodes are moreover configured in such a manner as to provide the photo-current for controlling the bases of the photo-transistors. In the case of normal operating currents by way of the sections 11a, 11b, the photo-transistors are in contrast not fully controlled and a current that is provided by them does not exceed the ignition current that is required for triggering the igniter 3. If in contrast a resistance of the PTC thermistors 24a and 24b increases in the case of a short circuit and a corresponding high current flow by way of the sections 11a, 11b owing to the resulting increased temperature, the voltage drop across the PTC thermistors 24a and 24b also increases to a sufficiently great extent so that the light diodes of the optical couplers 25a and 25b are controlled accordingly to a sufficient extent and the photo-current at the photo-transistors is sufficient to provide the necessary ignition current for the igniter 3.

In so doing, it is also possible to mix the triggers 8a, 8b so that by way of example the first trigger 8a comprises an inductance 10a and the second trigger 8b comprises a PTC thermistor 24b.

The described embodiments are merely of an exemplary nature and serve to explain the disclosure. Depending upon the prevailing boundary conditions (existing installation space, auxiliary voltages and currents, etc.) it is possible to provide that other parameter values (inductances, capacitances etc.) are used.

LIST OF REFERENCE NUMERALS

1 Electrical circuit breaker
2 Switching arrangement
3 Igniter
4 Severing element
5 Current rail
6 Separation section
7 Protrusion
8a,8b Triggers
9,9a,9b Current
10a,10b Induction loop
11a,11b Section
12 High voltage battery
13a,13b High voltage cable
14-1a,14-1b Supply line
14-2a,14-2b Supply line
15a,15b Iron core
16a,16b Coupling element
17a,17b Spacing
18a,18b Double layer capacitor
19-1a,19-1b Electrode
19-2a,19-2b Electrode
20-1a,20-1b Double layer
20-2a, 20-2b Double layer
21a,21b Electrolyte
22a,22b Separator
23a, 23b Ions
24a,24b PTC thermistor
25a,25b Optical coupler
26 Pyro element 50 Motor vehicle
51 Connection unit
52 Contactor
53 Contactor
54a,54b Fusible safety fuse
55 Controller
56 Current sensor
57 Battery cell
58a Master lines
58b Auxiliary lines
59a Electric motor
59b Air-conditioning compressor
59c Feeder
59d Charging device
59e DC/DC converter

The invention claimed is:

1. An electrical circuit breaker, comprising:
an electro-pyrotechnic igniter;
a movable severing element movable by the electro-pyrotechnic igniter; and
a current rail having a separation section,
wherein the movable severing element is arranged in relation to the electro-pyrotechnic igniter and the separation section of the current rail so that, after the electro-pyrotechnic igniter is triggered, the movable severing element is set in motion and severs the current rail in the separation section, and
wherein the electrical circuit breaker further comprises at least one trigger configured to couple to the current rail to directly provide an ignition current necessary for triggering the electro-pyrotechnic igniter based on a current supplied by at least one section of the current rail or based on a temporal change in the current in response to the current supplied on the at least one section of the current rail or the temporal change of the current exceeding a limit value, wherein the at least one trigger comprises an induction loop, wherein the inductance of the induction loop is defined so the induction loop provides the necessary ignition current by an inductive coupling with at least one section of the current rail.

2. The electrical circuit breaker of claim 1, wherein the electrical circuit breaker is a pyro element in which the at least one trigger is integrated.

3. The electrical circuit breaker of claim 1, wherein the at least one trigger comprises an iron core that is moved into the induction loop and the inductance is changed by said iron core.

4. An electrical circuit breaker, comprising:
an electro-pyrotechnic igniter;
a movable severing element movable by the electro-pyrotechnic igniter; and
a current rail having a separation section,
wherein the movable severing element is arranged in relation to the electro-pyrotechnic igniter and the separation section of the current rail so that, after the electro-pyrotechnic igniter is triggered, the movable severing element is set in motion and severs the current rail in the separation section, and
wherein the electrical circuit breaker further comprises at least one trigger configured to couple to the current rail to directly provide an ignition current necessary for triggering the electro-pyrotechnic igniter based on a current supplied by at least one section of the current rail or based on a temporal change in the current in response to the current supplied on the at least one section of the current rail or the temporal change of the current exceeding a limit value, wherein the at least one trigger comprises a coupling element, wherein a capacitance that corresponds to the coupling element is defined so the coupling element provides the necessary ignition current by a capacitive coupling with at least one section of the current rail.

5. An electrical circuit breaker, comprising:
an electro-pyrotechnic igniter;
a movable severing element movable by the electro-pyrotechnic igniter; and
a current rail having a separation section,
wherein the movable severing element is arranged in relation to the electro-pyrotechnic igniter and the separation section of the current rail so that, after the electro-pyrotechnic igniter is triggered, the movable severing element is set in motion and severs the current rail in the separation section, and
wherein the electrical circuit breaker further comprises at least one trigger configured to couple to the current rail to directly provide an ignition current necessary for triggering the electro-pyrotechnic igniter based on a current supplied by at least one section of the current rail or based on a temporal change in the current in response to the current supplied on the at least one section of the current rail or the temporal change of the current exceeding a limit value, wherein the at least one trigger comprises a PTC thermistor, wherein the PTC thermistor is dimensioned and arranged in or on the current rail so a voltage that is dropping across the PTC thermistor and is produced as a result of the current that is flowing through the PTC thermistor provides the necessary ignition current.

6. The electrical circuit breaker of claim 1, wherein at least two triggers are provided, wherein a first section of the current rail is allocated to the first trigger and a second section of the current rail is allocated to the second trigger, wherein the currents flowing through the first section and the second section are different.

7. A method for operating an electrical circuit breaker, the method comprising:
providing an ignition current for an electro-pyrotechnic igniter;
triggering the electro-pyrotechnic igniter;
moving a movable severing element by the triggered electro-pyrotechnic igniter; and
severing a separation section of a current rail by the movable severing element,
wherein the ignition current necessary for triggering the electro-pyrotechnic igniter is directly provided by coupling at least one trigger to the current rail based on a current supplied on at least one section of the current rail or based on a temporal change in the current in response to the current that is supplied on the at least one section of the current rail or the temporal change of the current exceeding a limit value, wherein the at least one trigger comprises an induction loop, wherein the inductance of the induction loop is defined so the induction loop provides the necessary ignition current by an inductive coupling with at least one section of the current rail.

8. An electrical traction supply system in a motor vehicle, the electrical traction supply system comprising:
a high voltage supply source;
an electric motor; and
at least one additional high voltage component,
wherein the electric motor is connected to the high voltage supply source by master cables and the at least one additional high voltage component is connected to the high voltage supply source by auxiliary cables, wherein the master cables and the auxiliary cables respectively include an electrical circuit breaker that includes an electro-pyrotechnic igniter, a movable severing element movable by the electro-pyrotechnic igniter, and a current rail having a separation section, wherein the movable severing element is arranged in relation to the electro-pyrotechnic igniter and the separation section of the current rail so that, after the electro-pyrotechnic igniter is triggered, the movable severing element is set in motion and severs the current rail in the separation section, and wherein the electrical circuit breaker further comprises at least one trigger configured to directly provide an ignition current necessary for triggering the electro-pyrotechnic igniter based on a current supplied by at least one section of the current rail or based on a temporal change in the current in response to the current supplied on the at least one section of the current rail or the temporal change of the current exceeding a limit value, wherein the at least one trigger comprises an induction loop, wherein the inductance of the induction loop is defined so the induction loop provides the necessary ignition current by an inductive coupling with at least one section of the current rail.

* * * * *